US 6,719,376 B1

(12) United States Patent
Klein et al.

(10) Patent No.: US 6,719,376 B1
(45) Date of Patent: Apr. 13, 2004

(54) PROCESS FOR ACTUATING FIRST AND SECOND BRAKES OF A VEHICLE SIMULTANEOUSLY

(75) Inventors: Bodo Klein, Barsinghausen (DE); Axel Stender, Hameln (DE); Christian Wiehen, Burgwedel (DE); Norbert Witte, Wunstorf (DE)

(73) Assignee: Wabco GmbH, Hannover (DE)

( * ) Notice: Subject to any disclaimer, the term of this patent is extended or adjusted under 35 U.S.C. 154(b) by 0 days.

(21) Appl. No.: 08/618,824

(22) Filed: Mar. 20, 1996

(30) Foreign Application Priority Data

Mar. 24, 1995 (DE) ......................................... 195 10 934

(51) Int. Cl.$^7$ ................................................. B60T 8/60
(52) U.S. Cl. ............................. 303/3; 303/15; 303/178; 303/DIG. 4
(58) Field of Search ..................... 303/DIG. 3, DIG. 4, 303/178, 166, 155, 183, 3, 15, 122.08

(56) References Cited

U.S. PATENT DOCUMENTS

| 4,320,506 | A | * | 3/1982 | Farazi et al. ............ 303/122.08 |
| 4,755,008 | A | * | 7/1988 | Imoto et al. ............ 303/DIG. 4 |
| RE33,486 | E | * | 12/1990 | Hirzel et al. ................. 303/178 |
| 5,004,299 | A | * | 4/1991 | Brearley et al. ........ 303/DIG. 4 |
| 5,011,236 | A | * | 4/1991 | Toepfer et al. ......... 303/DIG. 4 |
| 5,013,097 | A | * | 5/1991 | Gutzeit et al. .......... 303/DIG. 4 |
| 5,234,262 | A | | 8/1993 | Walenty et al. |

FOREIGN PATENT DOCUMENTS

| DE | 26 42 776 A1 | 3/1978 |
| DE | 30 45 982 A1 | 9/1981 |
| DE | 40 35 805 C1 | 3/1992 |
| DE | 41 12 845 A1 | 10/1992 |
| DE | 41 30 848 C1 | 3/1993 |
| DE | 41 31 169 A1 | 3/1993 |
| DE | 41 36 571 C1 | 3/1993 |
| DE | 41 42 670 A1 | 6/1993 |

(List continued on next page.)

Primary Examiner—Matthew C. Graham
(74) Attorney, Agent, or Firm—Proskauer Rose LLP

(57) ABSTRACT

A process for braking a vehicle having at least first and second brakes, comprises supplying energy to the first and second brakes so as to actuate them, the energy being distributed between the first and second brakes in accordance with the brakes' response energies. Preferably, the momentary values of the response energies are used so that the first and second brakes are actuated simultaneously. The momentary values of the response energies of the brakes may be determined as follows: (a) measuring the existing vehicle deceleration to determine a value of ground-vehicle deceleration, (b) supplying a braking test energy to the brake being tested, (c) measuring the deceleration of the vehicle after the braking test energy has been supplied to the brake being tested in order to determine a value of vehicle test deceleration, (d) comparing the value of ground-vehicle deceleration with the value of vehicle test deceleration, and (e) if the value of vehicle test deceleration is greater than the value of ground-vehicle deceleration by more than a predetermined tolerance value, repeating steps (a) to (d) with a reduced braking test energy until the difference between the value of vehicle test deceleration and the value of ground-vehicle deceleration is decreased to no more than the predetermined tolerance value, or (f) if the value of vehicle test deceleration is equal to or less than the value of ground-vehicle deceleration, repeating steps (a) to (d) with a higher braking test energy until the value of vehicle test deceleration exceeds the value of ground-vehicle deceleration by a value which is less than or equal to the predetermined tolerance value. The energy supplied to the brakes to actuate them may be in the form of pressure.

17 Claims, 3 Drawing Sheets

| | U.S. PATENT DOCUMENTS | | |
|---|---|---|---|
| DE | 38 29 949 C2 | 7/1993 |
| DE | 42 10 576 C1 | 8/1993 |
| DE | 42 06 238 A1 | 9/1993 |
| DE | 42 06 240 A1 | 9/1993 |
| DE | 42 30 911 A1 | 3/1994 |
| DE | 42 43 245 A1 | 6/1994 |
| DE | 43 10 422 A1 | 7/1994 |

| EP | 0 189 076 A2 | 7/1986 | |
|---|---|---|---|
| EP | 0 204 483 A2 | 12/1986 | |
| EP | 0 509 225 A2 | 10/1992 | |
| EP | 0 558 193 A1 | 9/1993 | |
| EP | 0 600 481 A1 | 6/1994 | |
| EP | 618117 | * 10/1994 | ................ 303/178 |
| WO | WO 93/12962 | 7/1993 | |

* cited by examiner

PROCESS FOR ACTUATING FIRST AND SECOND BRAKES OF A VEHICLE SIMULTANEOUSLY

This application contains subject matter which is related to the application entitled "Process To Determine The Response Pressure Of A Brake In A Vehicle Braking System" by the instant inventors which is being filed concurrently herewith.

BACKGROUND OF THE INVENTION

The present invention relates to a process for braking a vehicle containing at least two brakes actuated by an energy supply. As used herein, the term "energy" is not to be taken in the strictly physical sense, but as a collective term for all media which cause a brake to produce a braking force when supplied to the brake.

The term "brake" as used herein includes not only an individual module which produces a braking force directly, but also a plurality of such modules. Also included by the term "brake" can be the system components such as actuating, control and transmission devices belonging to one or several such modules downstream of the operating element (e.g., the brake pedal) actuated by the driver of the vehicle. A "brake" in the sense of the invention therefore also refers to a braking circuit as part of the vehicle braking system or the complete braking system of a vehicle in a vehicle train.

When energy is supplied to a brake, starting with the inactive state, the production of a braking force by the brake (i.e., the response of the brake) begins only when the energy attains a certain value. This value is referred to as the response energy of the brake. It is dependent on response resistances of the components producing the braking force directly and, if applicable, the system components installed between them and the energy detection point. The response resistances may be due, for example, to friction and to restoring forces, such as the force of a return spring.

Depending on their construction, the brakes of a vehicle may have different response energies. In such case, and when partial braking takes place, i.e., braking with low utilization of the total energy available to the brakes, the brake with the highest response energy, i.e., the brake which responds last, is significantly less strained than the brake(s) with lower response energy which respond earlier. Since most braking applications by far are partial brake applications during the operation of a vehicle, greater wear of certain parts, in particular, the brake linings, brake drums, and brake disks, occurs in the earlier-responding brake(s) due to higher strain.

It is the object of the present invention to improve the process for braking a vehicle containing at least two brakes so that a more even wear of all brakes is ensured.

SUMMARY OF THE INVENTION

This object is achieved by the present invention which provides a process for braking a vehicle having at least first and second brakes, comprising supplying energy to said first and second brakes so as to actuate them, said energy being distributed between said first and second brakes in accordance with the response energies of said first and second brakes. Preferably, a momentary value of the response energy of at least one of the brakes is used for distributing the energy. The momentary value of the response energy of the brake may be determined as follows:

(a) measuring the existing vehicle deceleration to determine a value of ground-vehicle deceleration, (b) supplying a braking test energy to the brake being tested, (c) measuring the deceleration of the vehicle after the braking test energy has been supplied to the brake being tested in order to determine a value of vehicle test deceleration, (d) comparing the value of ground-vehicle deceleration with the value of vehicle test deceleration, and (e) if the value of vehicle test deceleration is greater than the value of ground-vehicle deceleration by more than a predetermined tolerance value, repeating steps (a) to (d) with a reduced braking test energy until the difference between the value of vehicle test deceleration and the value of ground-vehicle deceleration is decreased to no more than the predetermined tolerance value, or (f) if the value of vehicle test deceleration is equal to or less than the value of ground-vehicle deceleration, repeating steps (a) to (d) with a higher braking test energy until the value of vehicle test deceleration exceeds the value of ground-vehicle deceleration by a value which is less than or equal to the predetermined tolerance value.

The response of the brakes at different times due to their different response energies may have a detrimental influence on the travel stability of the vehicle. The invention eliminates this possibility.

The solution provided by the invention can consist in practice of supplying different amounts of energy to the different brakes at the outset so that all of the brakes respond simultaneously.

The invention can be carried out with any form of energy which is used to apply the brakes, e.g., with electrical energy or with pressure. In case pressure is used to energize or actuate the brakes, liquid or gaseous energy carriers, e.g., compressed air, may be employed.

The response energies of the different brakes can be determined in any desired manner, e.g., as described further below as the momentary value(s) of the response energy or energies, or in the usual way, by means of a roller testing stand. In the latter case, the brake to be examined is supplied with energy, starting from an unactuated state, until the roller testing stand detects a first braking force. The energy indicated at that moment by an appropriately placed measuring instrument is the response energy.

Instances may occur, however, where the response energy of one or several brakes change during the operation of the vehicle. This may due, for example, to the maintenance and state of repair of the affected brake(s), to changes in material characteristics, as well as to changes in the brake layout. A change in the response energy may also occur, for instance, when a vehicle train consists of a motor vehicle and one or several trailers, wherein the trailers may be changed from time to time. Such case may be an example for changes in the brake layout.

In order to ensure the attainment of the advantages provided by the invention in such cases, the invention can be further developed so that it provides for the ascertainment of the momentary value(s) of the changing response energy or energies during one or several brake applications, basing the distribution of energy to the brakes on these momentary values.

Additional advantages of the invention are indicated in the description below of the embodiments shown in the drawings.

DETAILED DESCRIPTION OF THE PREFERRED EMBODIMENTS

Figure 1:
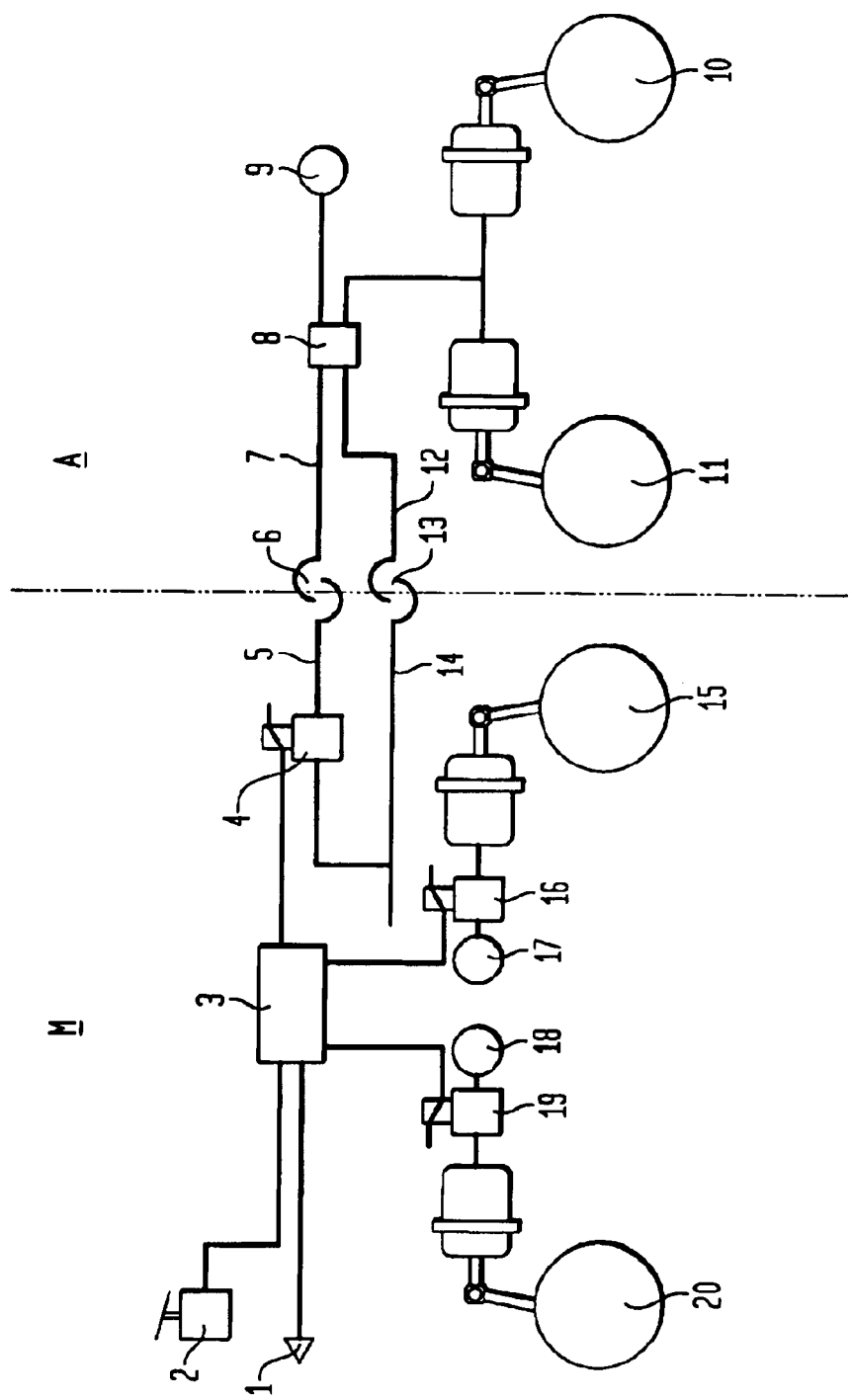
FIG. 1 schematically shows a vehicle train with a motor vehicle braking system M and a trailer braking system A.

FIG. 1 schematically shows the vehicle braking system of a vehicle train using pressure as the energy and compressed air as the energy carrier for the actuation of the brakes. The explanations given below in connection with pressure and compressed air also apply to other forms of energy and other energy carriers which may be used to actuate a brake.

The braking system shown in FIG. 1 comprises a motor vehicle braking system M and a trailer braking system A. They are coupled in a known manner via supply lines 12 and 14 with coupling head 13, and trailer brake lines 5 and 7 with coupling head 6.

The trailer braking system contains pressure-activated trailer brakes on both sides of each trailer axle. Brakes 10 and 11 shown on one side include appertaining brake cylinders and mechanical transmission parts.

The trailer braking system A is controlled by a control device in the form of a trailer brake valve 8. The pressure medium transmitted from the motor vehicle braking system M via supply lines 12 and 14 to the trailer is conveyed via trailer brake valve 8 to a trailer reservoir 9. The trailer brake pressure from the motor vehicle braking system M is transmitted to trailer brake valve 8 via trailer brake lines 5 and 7. Upon receiving a trailer brake pressure, trailer brake valve 8 connects the trailer reservoir 9 to trailer brakes 10 and 11 and allows pressure to reach the latter from the trailer reservoir supply 9. The extent of said pressure is determined by the degree of trailer brake pressure. The trailer braking system A described is a conventional dual-line trailer braking system.

The motor vehicle braking system M contains pressure-actuated brakes on both sides of each axle. The motor vehicle brakes 15 and 20 shown on one side, include the appertaining brake cylinders and mechanical transmission means. Reservoirs 17 and 18 supply brakes 15 and 20, respectively. Reservoirs 17 and 18 are supplied in the usual manner with pressure medium through separate lines secured against each other from a pressure means installed on the motor vehicle, not shown here. Thus, the motor vehicle braking system M in a conventional manner has two brake circuits (18,19, 20) and (17,16,15). Trailer supply lines 12 and 14 and trailer reservoir 9 are also supplied in the usual manner via separate lines secured against each other from the pressure means installed on the motor vehicle.

The motor vehicle contains electrical controls which operate the braking system when it is actuated by the driver. The electrical controls include a brake value transmitter 2, electronic control unit 3, electrically controlled pressure modulators 16 and 19 for brakes 15 and 20, and trailer control valve 4, which is electrically controlled.

Pressure modulators 16 and 19 are located between reservoirs 17 and 18 and brakes 15 and 20, respectively. The trailer control valve 4 is connected to supply lines 12 and 14 on one side and to trailer brake lines 5 and 7 on the other side.

To actuate the vehicle brake system, the driver of the vehicle train introduces an actuating signal into brake value transmitter 2 by means of an actuating element, which is part of brake value transmitter 2, e.g., by depressing a pedal. The actuating signal may be a force exerted on the actuating element and/or movement of the actuating element itself. When the actuating signal is received, brake demand value transmitter 2 transmits a desired value signal to electronic control unit 3. Electronic control unit 3 transforms the desired value signal into pressure requesting signals which pressure modulators 16 and 19 and trailer control valve 4 can read.

Upon receiving these signals from electronic control unit 3, pressure modulators 16 and 19 connect reservoirs 17 and 18 to the respective brakes 15 and 20. The connection is maintained until a pressure has accumulated in brakes 15 and 20 which corresponds to the pressure requesting signals received by pressure modulators 16 and 19. Trailer control valve 4 connects trailer supply lines 12 and 14 to the trailer brake lines 5 and 7 upon receiving the signal from the electronic control unit 3 until a braking pressure corresponding to the pressure requested by the signal has accumulated in trailer brake lines 5 and 7. The signals which are transmitted to pressure modulators 16 and 19 and to trailer control valve 4 are representative of the pressures passing through these devices.

However, the pressure-requesting signals and the appertaining pressures do not always behave in the same manner. While the pressure requesting signals practically jump to the values determined by the brake value signal, the corresponding pressures are built up with a time lag. In other words, the pressures trail after their associated pressure-requesting signals. This is due on the one hand to the propagation speed of the pressure, which is considerably less than the propagation speed of the electrical signals, and on the other hand to the volumes to be brought under pressure, as well as to the response times of the pressure modulators 16 and 19, and the trailer control valve 4.

If the driver of the vehicle train stops or reduces the actuation of the vehicle braking system by stopping or reducing the actuating signal going into the brake value transmitter 2, electronic control unit 3 stops or reduces the pressure-requesting signals, with the result that pressure modulators 16 and 19 and trailer control valve 4 release or reduce the pressures, again trailing the pressure-requesting signals. In converting the desired value signal into pressure-requesting signals, electronic control unit 3 can accommodate any additional information supplied. This information may include the loading state of the motor vehicle and/or trailer, the loads on the motor vehicle axles, and the force in the connection between the motor vehicle and trailer. The individual pressure-requesting signals and the appertaining pressures may therefore be different. To the extent described thus far, the vehicle braking system is a conventional, electronically controlled vehicle braking system.

This vehicle braking system furthermore makes it possible to achieve a pressure distribution among the brakes in accordance with the response pressures of the brakes. In this connection, the term "brake" is to be understood as referring to the complete trailer braking system A per se and one braking circuit of the motor vehicle braking system M, consisting of the motor vehicle reservoir (17 or 18), the pressure modulator (16 or 10), and the motor vehicle brake (15 or 20). Furthermore, the term "response pressure" refers to the minimum pressure which must be supplied to a brake to generate a braking force in that brake.

Due to the above-mentioned dependency of the pressures upon the pressure-requesting signals, electronic control unit 3 also transmits response pressure-requesting signals corresponding to the response pressures of the above-defined brakes determined in any desired manner.

For the purpose of the above-mentioned pressure-distribution according to the response pressures of the brakes, a memory is installed in the control electronics (3) in which appropriate response pressure-requesting signals are stored. Furthermore, the electronic control unit 3 is programmed in such manner that the pressure-requesting signals do not ramp up from zero at the beginning of a brake application, but immediately emits the response pressure-requesting signals. To use concrete figures as an example, the following response pressures shall be assumed:

TABLE I

| Braking circuit (17, 16, 15) | 0.5 bar |
| Braking circuit (18, 19, 20) | 0.8 bar |
| Trailer braking system (A) | 1.0 bar |

At the start of a brake application, the electronic control unit 3 adjusts the pressure-requesting signals immediately according to the values 0.5 bar, 0.8 bar, 1.0 bar. Accordingly, the pressures supplied to the motor vehicle brakes 15, 20 as well as the trailer braking pressure assume the values of the applicable response pressures at the start of a brake application. As a result, all of the above-defined brakes respond at the same time, so that the vehicle braking system meets the requirements for even wear on said brakes.

Concerning the continued evolution of the pressure-requesting signals and thereby of the pressures, the electronic control unit 3 can be programmed either to maintain or to reduce the differences among the brakes in accordance with their different response pressures in case of an increase of the desired-value signal.

The term "start of a brake application" used above requires explanation. The brake value transmitter 2 has a "response time." This is the time delay which occurs between the first action on the brake value transmitter 2 by the vehicle driver (point in time t0 in FIG. 3) and the first emission of a desired-value signal by the brake value transmitter 2 at a point in time (t2 in FIG. 3). This time delay is due to an idle travel of the brake value transmitter 2. During this response time, a brake light switching signal is normally emitted by the brake value transmitter 2. It is possible to program electronic control unit 3 to utilize the point in time of the first emission of a desired-value signal, i.e., the end of the response time (t2), or another point in time within the response time, e.g., the point in time (t1), as the "start of a brake application." Electronic control unit 3 may also be programmed to recognize different points in time as the "start of a brake application" for different brakes, e.g., an earlier point in time for the trailer braking system A and one or several later points in time for the braking circuits of the motor vehicle braking system M. This provides the possibility for further optimizing the response behavior of the above-described vehicle braking system.

Assume that the response pressure of the trailer braking system A changes during the operation of the vehicle. Such a case occurs, for example, when a motor vehicle is used with different trailers having different trailer braking systems A, each of which may have different response pressures as is usual.

In such a case, the described vehicle braking system can be further developed so that it measures the current momentary value of the response pressure of the trailer braking system A and bases the adjustment of the response pressure-requesting signals and thereby of the pressure distribution on this momentary value.

As described below in greater detail, the electronic control unit 3 in this further development first measures the momentary value of the response pressure of the newly coupled trailer and then adjusts the pressure-requesting signal sent to the trailer control valve 4.

Beyond the scope of the vehicle braking system as described so far, this further development requires a possibility to determine the vehicle train deceleration. For this purpose, a deceleration sensor such as that identified by the reference number 1 may be required as an additional device.

If, however, travel-distance and/or travel-speed dependent signals are already produced and/or processed in the vehicle braking system or in the vehicle train for some other reasons, no additional deceleration sensor is needed. Such is the case, e.g., when the vehicle braking system is provided with an antilock brake system (ABS) which provides wheel deceleration signals corresponding to vehicle train deceleration. Another such case exists, for instance, if a tacho-signal is obtained in the vehicle from which the electronic control unit 3 can calculate the vehicle train deceleration.

In a first embodiment of the invention, the detection of the momentary value of the response pressure (pa) of the trailer braking system A is made during brake tests which occur without the driver having actuated the braking system. Characteristics are programmed into electronic control unit 3 through which suitable points in time for the implementation of brake tests can be identified. The electronic control unit 3 is programmed so that the brake tests can be stopped in case of a change in characteristics before a particular measuring time (tm) which will be further explained below. Electronic control unit 3 can also be programmed so that a brake test is not performed every time these characteristics are present, but only selectively, for example, every xth time they occur, or randomly selected. Such characteristics could exist, e.g., when the driver of the vehicle releases the accelerator (gas pedal) without actuating brake value transmitter 2.

Figure 2:
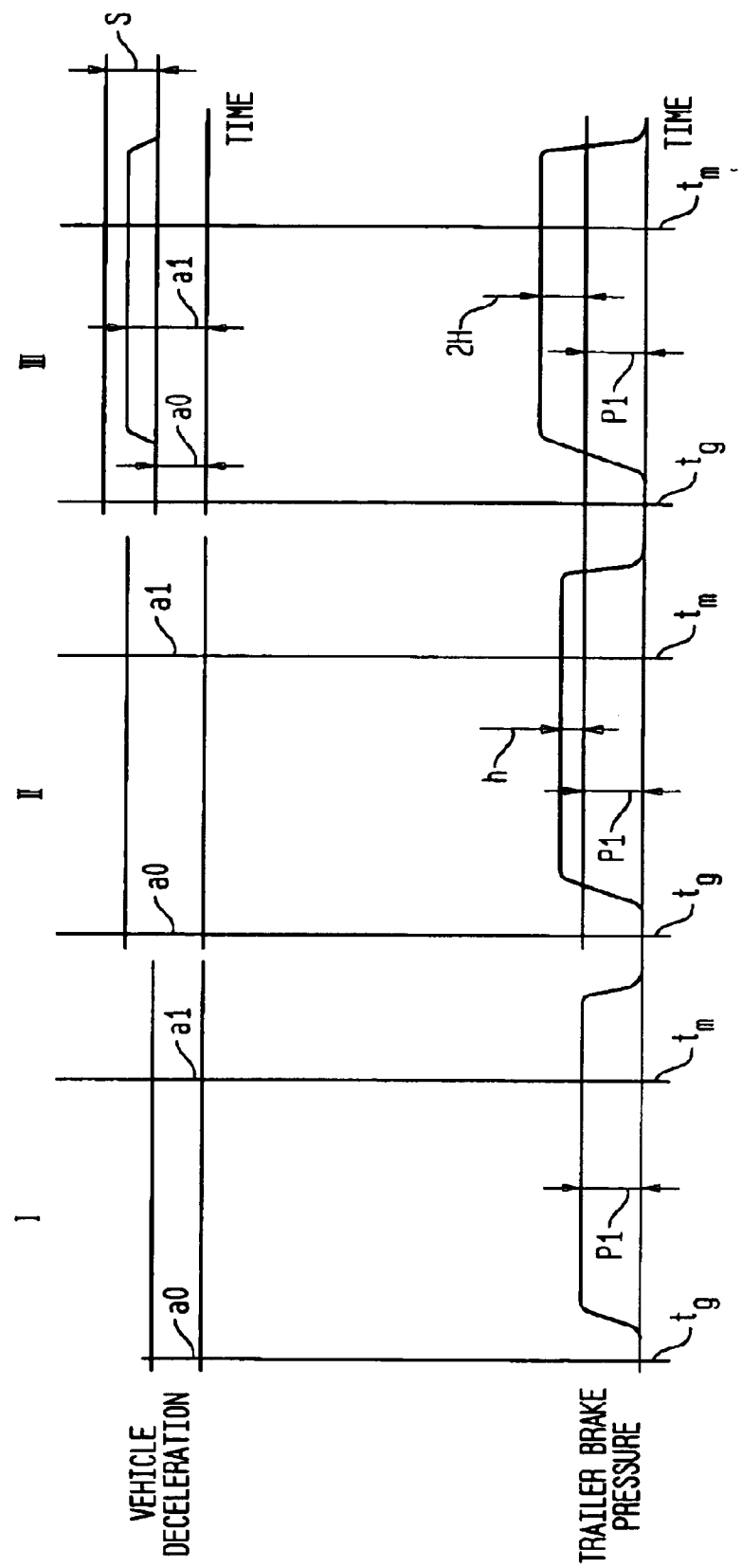
FIGS. 2 and 3 show graphs of the increase in braking pressure as a function of time (bottom half). The top half of FIGS. 2 and 3 show vehicle train deceleration as a function of time in Brake Tests I, II, and III.

FIG. 2 shows, in the bottom portion thereof, the ideal progression of the trailer braking pressure for Brake Tests I, II and III as a function of time. The upper portion of FIG. 2 shows the ideal progression of the vehicle train deceleration as a function of time in Brake Tests I, II and III.

When a brake test is started, electronic control unit 3 detects the existing deceleration of the vehicle train as the ground-vehicle deceleration (a0) at a point in time (tg). A ground-vehicle deceleration (a0) can have different reasons such as road resistance, road conditions such as curves and hills, motor braking effect or effect of a dynamic brake. After ground-vehicle deceleration (a0) is detected the electronic control unit 3 transmits, a signal to trailer control valve 4 requesting a low trailer test braking pressure (p1), e.g., of 0.5 bar. Due to the dependence of the trailer braking pressure on the pressure-request signal, the latter could also be designated pressure (p1).

However, as mentioned further above, the actual build-up of trailer braking pressure (p1) lags behind the signal requesting increased pressure. This is shown in FIG. 2 by the trailer braking pressure not jumping but increasing as a function of time until it reaches the requested level (p1).

At a predetermined measuring time (tm), electronic control unit 3 detects the deceleration of the vehicle train as vehicle test deceleration (a1) which is existing after transmitting the pressure requesting signal and the build-up of corresponding pressure(s) in the trailer brakes 10 and 11. Times (t1) and (tm) are programmned into electronic control unit 3 by a time pulse generator contained in electronic control unit 3. Measuring time (tm) is predetermined so that pressure build-up has been completed in trailer brakes 10 and 11.

If trailer braking pressure (p1) exceeds the momentary value of the response pressure (pa) of the trailer braking system, vehicle test deceleration (a1) will be greater than the ground-vehicle deceleration (a0). If the trailer braking pressure (p1) does not reach the momentary value of the response pressure (pa) of the trailer braking system or just reaches it, the vehicle test deceleration (a1) will be no greater than the ground-vehicle deceleration (a0). For verification, electronic control unit 3 compares ground-vehicle deceleration (a0) detected at point in time (tg) with the vehicle test deceleration (a1) detected at measuring time (tm).

As shown in the upper half of FIG. 2, this comparison results in vehicle test deceleration (a1) being equal to ground vehicle deceleration (a0) in Braking Test I. This result shows that the trailer test braking pressure (p1) did not exceed the response pressure (pa) of the trailer braking system A. These results do not show whether or not trailer test braking pressure (p1) is still below the desired momentary value or has just reached it. Therefore, electronic control unit 3 is programmed so that it considers the desired momentary response pressure reached when the trailer test braking pressure has exceeded the true momentary value within the range of a predetermined tolerance value (S).

After measuring time (tm), electronic control unit 3 cancels the pressure-requesting signal so that trailer test braking pressure (p1) and the corresponding pressures in trailer brakes 10 and 11 may be reduced.

If the characteristics for brake testing still apply, or if they apply again later, electronic control unit 3 initiates a second Brake Test II which repeats the steps of Brake Test 1, while increasing the trailer test braking pressure (p1) by a predetermined step (h). For example, (h) may be 0.2*(p1). With the numerical value of 0.5 bar assumed as an example for (p1) in Brake Test 1, (h) is therefore 0.1 bar, and the trailer test braking pressure in Brake Test II is 0.6 bar.

As can be seen in FIG. 2, the ground-vehicle deceleration (a0) in Brake Test II may be greater than that in Brake Test I. This may be due to other initial conditions which appertain at the time of Brake Test II, e.g., to a steeper slope of the road. However, this plays no role because the absolute level of the detected vehicle deceleration is not needed for the determination of the desired momentary value. As shown in FIG. 2, the increased trailer test braking pressure of 1.2*(p1) does not lead to an increased vehicle deceleration in the Brake Test II, i.e., the test braking pressure in Brake Test II has not reached or has just reached the desired momentary value.

Electronic control unit 3 now repeats the previous steps in Brake Test III with the trailer test braking pressure increased by 2h and having a value of 1.4*(p1). FIG. 2 shows that in Brake Test III, the ground-vehicle deceleration (a0) is again different from the previous brake tests. Further, FIG. 2 shows that now vehicle test deceleration (a1) exceeds ground-vehicle deceleration (a0) and this means that electronic control unit 3 determines that a1>a0. In Brake Test III, the trailer test braking pressure of 1.4*(p1) has exceeded the desired momentary value.

Electronic control unit 3 must now verify acceptance of the trailer braking pressure 1.4*(p1) of Brake Test III as the desired momentary value. For this purpose, electronic control unit 3 compares the difference (a1)–(a0) with the predetermined tolerance value (S). As FIG. 2 shows that (a1)–(a0)<S, electronic control unit 3 may accept the trailer test braking pressure applied in Brake Test III, i.e., (1.4*p1), as the desired momentary value of the response pressure of the trailer braking system A. This also applies when (a1)–(a0)=S.

Assume, however, that electronic control unit 3 determines in Brake Test III that the difference (a1)–(a0) exceeds the predetermined tolerance value (S), i.e., (a1)–(a0)>S. For this case, electronic control unit 3 is programmed to repeat the steps previously described for one or more additional brake tests. However, the last trailer test braking pressure 1.4*(p1) will now be decreased until the difference (a1)–(a0) is between 0 and the predetermined tolerance value (S), that is until 0<(a1)–(a0)<S. In order for trailer test braking pressures other than those previously described to be possible, it is advisable to apply pressure reductions in steps other than (h), e.g., in steps of (0.1)*(p1).

Assume now that the program of electronic control unit 3 has ascertained a difference of (a1)–(a0) exceeding the predetermined tolerance value (S) in Brake Test I, i.e., (a1)–(a0)>S. In this event, electronic control unit 3 is programmed to reduce the trailer test braking pressure in the second, third, etc., braking tests in steps as described above until 0<(a1)–(a0)≦S is ascertained. However, the changes in test braking pressures can again equal 0.2*(p1), for example. If electronic control unit 3 ascertains that (a1) equals (a0), i.e., (a1)–(a0)=0 in carrying out the brake tests with reduced trailer test braking pressure, the steps described in Brake Tests I to III would be repeated.

It is apparent that through a suitable definition of the tolerance value (S) and the magnitude of the steps of increase or decrease in trailer test braking pressure, the detected momentary value of the response pressure can be brought to the true momentary value of the response pressure to any degree of precision desired.

In a manner not shown here, electronic control unit 3 can be designed to detect ground-vehicle deceleration (a0) at a point in time which follows measuring time (tm). At this point, the pressure-requesting signal must have been cancelled and the trailer test braking pressure and the pressures of trailer brakes 10 and 11 must have dropped off completely.

The driver of the vehicle will not be aware of the test braking events as long as the trailer braking pressure does not exceed the desired momentary value of the response pressure of the trailer braking system A. If the trailer test braking pressure exceeds the desired momentary value, the driver of the vehicle may become aware of the braking test. However, since the difference between the vehicle test deceleration (a1) and the ground-vehicle deceleration (a0), i.e., (a1)–(a0), is very small, the driver of the vehicle may still remain practically unaware of the braking test since it may be masked by the normal unevenness of the speed of the vehicle in operation.

Figure 3:
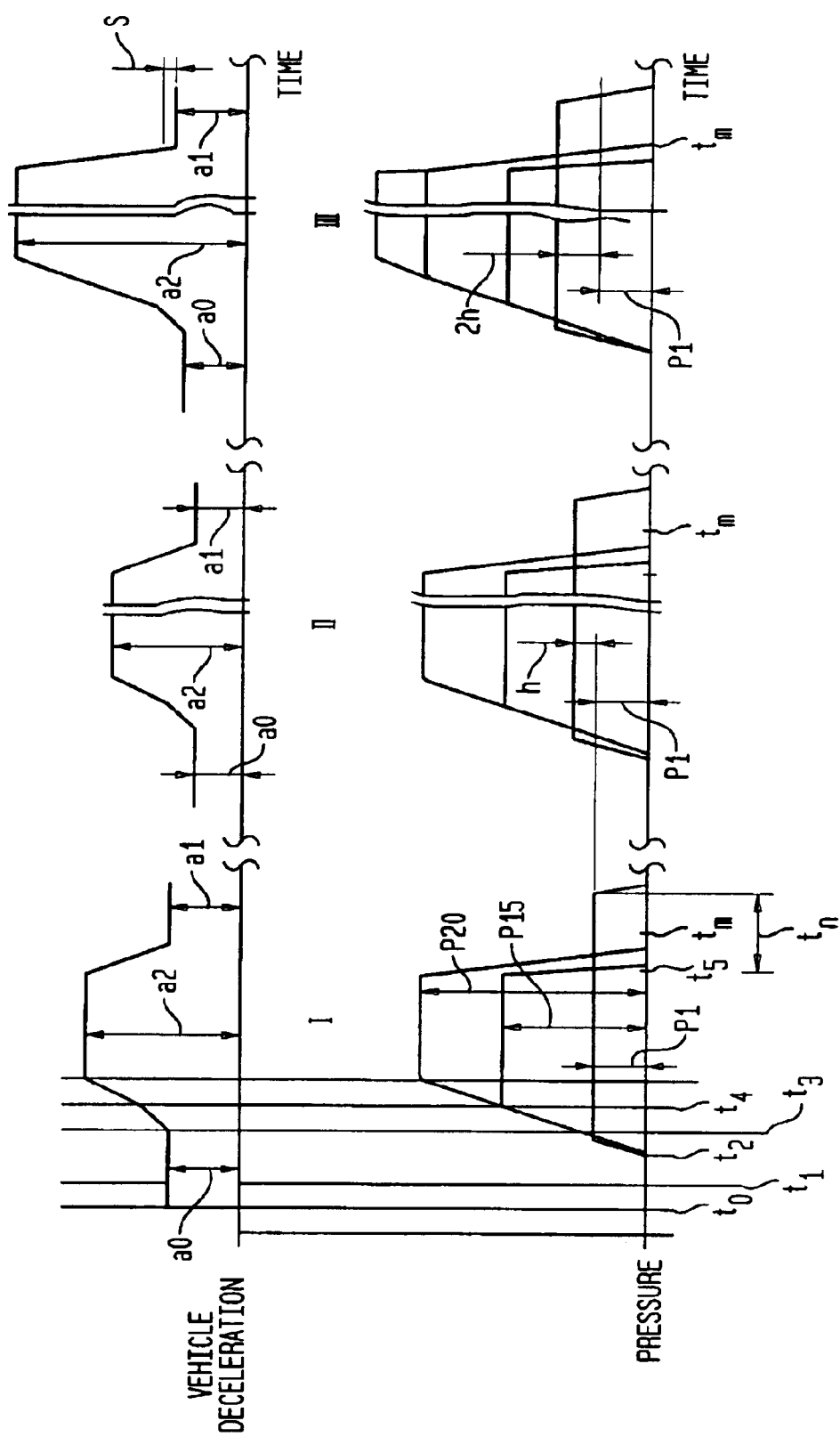

In a second embodiment of the invention illustrated in FIG. 3, Brake Tests I, II, and III are integrated into effective brake actions initiated by the driver of the vehicle. Since the trailer braking system A produces little, if any, braking action in these effective brake actions, it is advantageous to program electronic control unit 3 to perform test braking only when the driver of the vehicle actuates the vehicle braking system in the lower range of partial braking, i.e., with a minimal actuating signal and a correspondingly low level of pressure. In this embodiment, trailer test braking pressure (p1) can be designated as a first pressure and the pressure affecting the motor vehicle braking system M as a second pressure. Even when different pressures are active in the different braking circuits of the motor vehicle braking system M, together they can be considered as a second pressure when determining the momentary value of the response pressure of the trailer braking system A. The reason for this is that different pressures in the motor vehicle system are not significant in the determination of the momentary value of the response pressure.

In this second embodiment, time (t1) for detecting ground-vehicle deceleration (a0) lies in a first variant within the response time of brake value transmitter 2. As mentioned previously, the "response time" of brake value transmitter 2 is the time delay which occurs between the first action of the driver of the vehicle on the brake value transmitter 2 at time (t0) and the first emission of a desired value signal by brake value transmitter 2 at time (t2). The brake light or switch signal occurring within this response time is used as an actuating signal for detecting ground-vehicle deceleration (a0) at time (t1).

Electronic control unit 3 is programmed to transmit a pressure requesting signal corresponding to the trailer test braking pressure (p1) to trailer control valve 4 at the end of the response time at the point in time (t2). This pressure-requesting signal is independent of the actuating signal introduced by the driver of the vehicle to the brake value transmitter 2. At the same time, electronic control unit 3 transmits pressure-requesting signals to pressure modulators 16 and 19 in the motor vehicle braking system M. These pressure requesting signals depend upon the actuating signal the driver of the vehicle introduced to brake value transmitter 2. Pressures (p15) and (p20) transmitted to motor vehicle brakes 15 and 20 correspond to these pressure-requesting signals.

As shown in the bottom half of FIG. 3, at time (t2), build up of the trailer test braking pressure (p1) and pressures (p15, p20) transmitted to motor vehicle brakes 15 and 20 begins. At time (t3), pressure (p15) transmitted to motor vehicle brake 15 has reached the value of the response pressure of the appertaining braking circuit (17, 16, 15) in the motor vehicle braking system M as shown in the upper half of FIG. 3. At this point in time, the vehicle train deceleration increases starting from ground-vehicle deceleration (a0). At time (t4), pressure (p20) transmitted to motor vehicle brake 20 has reached the value of the response pressure of braking circuit (18, 19, 20) in the motor vehicle braking system M. The gradient of vehicle deceleration increases at this point as well as of the corresponding pressures in time (t4). After complete achievement of pressures (p15, p20) in motor vehicle brakes 15 and 20, and of the trailer braking pressure (p1) in trailer brakes 10 and 11, the vehicle is braked at a vehicle deceleration (a2).

The pressures (p15, p20) transmitted to motor vehicle brakes 15 and 20 have different values. This assumes electronic control unit 3 processes different data in editing to the pressure-requesting data for pressure modulators 16 and 19. If electronic control unit 3 is not designed for this, or if the data can be such, then the pressures (p 15, p20) are equal. FIG. 3 also is based on the assumption that the braking circuits of the motor vehicle braking system M have different response pressures. However, these response pressures may be equal, or differ so slightly from each other as to be considered equal.

At time (t5), the driver of the vehicle terminates the actuation of the vehicle braking system by stopping the brake actuation signal inputted into brake value transmitter 2, resulting in stoppage of the pressure-requesting signals to pressure modulators 16 and 19, and the pressures (p15, p20) transmitted to motor vehicle brakes 15 and 20 start to decrease. However, electronic control unit 3 maintains the pressure-requesting signal transmitted to trailer control valve 4 for a predetermined trailing time (tn) after time (t5). The duration of the trailing time (tn) is calculated so that a complete drop of the pressures (p15, p20) transmitted to motor vehicle brakes 15 and 20 takes place during that time in accordance with experience and that additionally the measuring time (tm) lies within the trailing time. Together with pressures (p15, p20) transmitted to motor vehicle brakes 15 and 20, the vehicle deceleration (a2) also drops. After the total drop of pressures (p15, p20), the vehicle deceleration is reduced to that of the vehicle test deceleration (a1). Electronic control unit 3 detects the vehicle test deceleration (a1) at the measuring time (tm). After detecting vehicle test deceleration (a1), electronic control unit 3 is programmed as described in connection with the first embodiment to detect the momentary value of the response pressure of the trailer braking system A.

As schematically illustrated in FIG. 3, during Brake Test I, the vehicle test deceleration (a1) does not exceed ground-vehicle deceleration (a0), and it is therefore not certain whether trailer test braking pressure (p1) has attained the desired momentary value of the response pressure of the trailer braking system.

During Brake Test II, the trailer test braking pressure is increased by step (h). However, the test-vehicle deceleration (a1) is still no greater than the ground-vehicle deceleration (a0). Thus, it is still not certain whether the desired momentary value has been reached. Only at Brake Test III in which test trailer braking pressure is increased by (2h) is the test-vehicle deceleration (a1) greater than ground-vehicle deceleration (a0) and the desired momentary value of the response pressure of the trailer braking system attained and exceeded.

Further, from FIG. 3 it can be seen that in Brake Test III, the difference between test vehicle deceleration (a1) and ground-vehicle deceleration (a0) is less than the predetermined tolerance value (S), i.e., (a1)−(a0)<S, so that electronic control unit 3 recognizes the trailer brake pressure of 1.4*(p1) applied in this Brake Test III as the desired momentary value of the response pressure (pa) of the trailer braking system A.

In the second embodiment described above and illustrated in FIG. 3, ground-vehicle deceleration (a0) may be measured instead of at the beginning of a braking action at time (t1), at the end of the brake test after time (tn). In both the first and second embodiments described above, electronic control unit 3 can also be programmed to continuously measure the vehicle train deceleration and use momentary values at times (tg, t1, tm) or, at later times as well, for determining the ground and/or vehicle test deceleration (a0) and (a1).

The foregoing discussion concerning the determination of the momentary value of the response pressure of the trailer braking system A is applicable to the determination of the momentary value of the response pressure of the motor vehicle braking system M and to its individual braking circuits. For example, assume that the momentary value of the response pressure of the braking circuit (18, 19, 20) is to be determined. In this case, electronic control unit 3 has to act with the pressure requesting signal to pressure modulator 19 assigned to this braking circuit and the appertaining pressure (p20) as in the foregoing with the pressure requesting signal to trailer control valve 4 and the trailer test braking pressure (p1). In the alternative, with integration of the brake test into an effective braking action, the pressure (p20) is the first pressure and the pressure (p15) is the second pressure in this example.

The skilled artisan will recognize that the determination of the momentary value of the response pressure of the motor vehicle braking system M and the braking circuits associated therewith can be carried out as described above with our without the trailer braking system.

The response pressures or momentary values described heretofore comprise all the response resistances which occur after the corresponding pressure-requesting signal. In the case of the trailer braking system A, these are the response resistances of the trailer control valve 4, of the trailer brake valve 8 as well as of the trailer brakes 10, 11, and, in case of the braking circuit 18, 19, 20 of the motor vehicle braking system M, as an example the response resistances of the pressure modulator 19 and of the motor vehicle brake 20. If additional components as known but not shown here are present in the above-mentioned braking systems, e.g., automatic braking force regulators (ALB), relay valves, pressure limiting valves, etc., their response resistances are also included in the ascertained response pressure.

In determining a response pressure, it is possible to exclude the response resistance of one or more of the system components of the motor vehicle brakes and trailer brakes. This is accomplished by installing an electric pressure sensor downstream of the system components not included. The pressure sensor is electrically connected to electronic control unit 3. Addition of the pressure sensor is often not necessary since one or more pressure sensor may already be installed due to the existing pressure modular construction. If an electric pressure sensor is installed, electronic control unit 3 must be programmed to measure the pressure-requesting signals to trailer control valve 4 or to the applicable pressure modulators 16 and 19 so that pressures corresponding to trailer test braking pressures are received and measured by the pressure sensor.

To determine the response pressure of a pressure medium input to motor vehicle brake 20, for example, a pressure sensor is installed at the appertaining brake cylinder or at a component directly supplying the brake cylinder with pressure, such as a pressure line or output of a pressure modulator. Electronic control unit 3 then adjusts the pressure-requesting signal sent to pressure modulator 19 in the brake tests described above so that the pressure sensor measures exactly the test pressure and reports it to electronic control unit 3.

In all other matters, that which is stated above concerning one embodiment applies to the other embodiment directly or in corresponding application, barring any contradictions.

The person schooled in the art also will recognize that the above embodiments do not exhaust the area of the invention, but that this area of protection comprises all embodiments whose characteristics fall under the claims of the patent. This protection extends in particular also to non-electrically controlled vehicles, i.e., to those of conventional design, with, for example, motor vehicle brake valve or pressure responsive trailer control valve.

We claim:

1. A process for braking a vehicle having at least first and second brakes, comprising:

supplying energy to said first and second brakes so as to actuate them, said energy being distributed between said first and second brakes in accordance with response energies characteristic of said first and second brakes, wherein a momentary value of the response energy of at least one of said first and said second brakes is determined in at least one brake actuation and wherein the distribution of said energy between said first and second brakes is based on said momentary value, and wherein the momentary value of the response energy of said at least one brake is determined as follows:

(a) measuring the existing vehicle deceleration of said vehicle to determine a value of ground-vehicle deceleration,
   (b) supplying a braking test energy to said brake to be tested,
   (d) measuring the deceleration of said vehicle after said braking test energy in step (b) has been supplied to the brake to be tested to determine a value of vehicle test deceleration,
   (e) if said value of vehicle test deceleration is greater than said value of ground-vehicle deceleration by more than a predetermined tolerance value, repeating steps (a) to (d) with a reduced braking test energy until the difference between the value of vehicle test deceleration and the value of ground-vehicle deceleration is decreased to no more than the predetermined tolerance value, or
   (f) if said value of vehicle test deceleration is equal to or less than said value of ground-vehicle deceleration, repeating steps (a) to (d) with a higher braking test energy until the value of vehicle test deceleration exceeds the value of ground-vehicle deceleration by a value which is less than or equal to said predetermined tolerance value.

2. The process of claim 1 wherein said energy is distributed between said first and second brake so as to actuate them simultaneously.

3. The process of claim 1 further comprising determining the momentary value of the response energy of said at least one brake as follows:

(a) supplying a first braking test energy to said first brake and a second braking test energy to said second brake,
   (b) releasing the energy supplied to said second brake,
   (c) maintaining the first braking test energy in said first brake for a predetermined trailing time,
   (d) during said trailing time, measuring the current vehicle deceleration of said vehicle to determine a value of vehicle test deceleration,
   (e) after said trailing time, measuring the vehicle deceleration to determine a vehicle of ground-vehicle deceleration,
   (f) comparing the value of ground-vehicle deceleration with the value of vehicle test deceleration,
   (g) if the value of vehicle test deceleration is greater than the value of ground-vehicle deceleration by more than a predetermined tolerance value, repeating steps (a) to (f) with a reduced first braking test energy until the difference between the value of vehicle test deceleration and the value of ground-vehicle deceleration has been reduced to no more than the predetermined tolerance value, or
   (h) if the value of vehicle test deceleration is equal to or less than the value of ground-vehicle deceleration, repeating steps (a) to (f) with a higher first braking test energy until the value of vehicle test deceleration exceeds the value of ground-vehicle deceleration by a value which is less than or equal to said predetermined tolerance value.

4. The process of claim 3 wherein said vehicle comprises a motor vehicle and a trailer, said first brake being a trailer braking system, said second brake being a motor vehicle braking system, and said first braking test energy comprises a trailer braking pressure transmitted from the motor vehicle braking system to the trailer braking system.

5. The process of claim 1 wherein said vehicle comprises a motor vehicle and a trailer, said first brake being a trailer braking system, said second brake being a motor vehicle braking system, and said braking test energy comprises a trailer braking test pressure transmitted from the motor vehicle braking system to the trailer braking system.

6. The process of claim 1 further comprising determining the momentary value of the response energy of said at least one brake as follows:
   (a) supplying a braking test energy to said brake to be tested,
   (b) measuring the deceleration of said vehicle after the braking test energy in step (a) has been supplied to the brake to be tested to determine a value of vehicle test deceleration,
   (c) releasing the energy supplied to said brake in step (a),
   (d) measuring the current vehicle deceleration of said vehicle to determine a value of ground-vehicle deceleration,
   (e) comparing the value of ground-vehicle deceleration with the value of vehicle test deceleration, and
   (f) if the value of vehicle test deceleration is greater than the value of ground-vehicle deceleration by more than a predetermined tolerance value, repeating steps (a) to (e) with a reduced braking test energy until the difference between the value of vehicle test deceleration and ground-vehicle deceleration is decreased to no more than the predetermined tolerance value, or
   (g) if the value of vehicle test deceleration is equal to or less than the value of ground-vehicle deceleration, repeating steps (a) to (e) with a higher braking test energy until the value of vehicle test deceleration exceeds the value of ground-vehicle deceleration by a value which is less than or equal to said predetermined tolerance value.

7. The process of claim 6 wherein said vehicle comprises a motor vehicle and a trailer, said first brake being a trailer braking system, said second brake being a motor vehicle braking system, and said braking test energy comprises a trailer braking pressure transmitted from the motor vehicle braking system to the trailer braking system.

8. The process of claim 1 further comprising determining the momentary value of the response energy of said at least one brake as follows:
   (a) measuring the existing vehicle deceleration of said vehicle to determine a value of ground-vehicle deceleration,
   (b) supplying a first braking test energy to said first brake and a second braking test energy to said second brake,
   (c) releasing the energy supplied to said second brake,
   (d) maintaining the first braking test energy supplied to said first brake for a predetermined trailing time,
   (e) during said trailing time, measuring the deceleration of said vehicle to determine a value of vehicle test deceleration,
   (f) comparing the value of ground-vehicle deceleration with the value of vehicle test deceleration, and
   (g) if said value of vehicle test deceleration is greater than said value of ground-vehicle deceleration by more than a predetermined tolerance value, repeating steps (a) to (f) with a reduced first braking test energy until the difference between the value of vehicle test deceleration and the value of ground-vehicle deceleration is decreased to no more than the predetermined tolerance value, or
   (h) if said value of vehicle test deceleration is equal to or less than said value of ground-vehicle deceleration, repeating steps (a) to (f) with a higher first braking test energy until the value of vehicle test deceleration exceeds the value of ground-vehicle deceleration by a value which is less than or equal to said predetermined tolerance value.

9. The process of claim 8 wherein said vehicle comprises a motor vehicle and a trailer, said first brake being a trailer braking system, said second brake being a motor vehicle braking system, and said first braking test energy comprises a trailer braking test pressure transmitted from the motor vehicle braking system to the trailer braking system.

10. A process for braking a vehicle having at least first and second brake actuable by supplying energy to said first and second brakes, each of said first and second brakes beginning production of a braking force only after the supplied energy is equal to or greater than a response energy which is specific for each of said first and second brakes, said process comprising starting a brake application in said vehicle by simultaneously supplying energy to each of said first and second brakes that is equal to its respective response energy, thereby causing said first and second brakes to begin production of a brake force simultaneously, wherein a momentary value of the response energy of at least one of said first and said second brakes is determined in at least one brake actuation and wherein the distribution of said energy between said first and second brakes is based on said momentary value, and wherein the momentary value of the response energy of said at least one brake is determined as follows:
   (a) measuring the existing vehicle deceleration of said vehicle to determine a value of ground-vehicle deceleration,
   (b) supplying a braking test energy to said brake to be tested,
   (c) measuring the deceleration of said vehicle after said braking test energy in step (b) has been supplied to the brake to be tested to determine a value of vehicle test deceleration,
   (d) comparing the value of ground-vehicle deceleration with the value of vehicle test deceleration, and
   (e) if said value of vehicle test deceleration is greater than said value of ground-vehicle deceleration by more than a predetermined tolerance value, repeating steps (a) to (d) with a reduced braking test energy until the difference between the value of vehicle test deceleration and the value of ground-vehicle deceleration is decreased to no more than the predetermined tolerance value, or
   (f) if said value of vehicle test deceleration is equal to or less than said value of ground-vehicle deceleration, repeating steps (a) to (d) with a higher braking test energy until the value of vehicle test deceleration exceeds the value of ground-vehicle deceleration by a value which is less than or equal to said predetermined tolerance value.

11. The process of claim 10 wherein said vehicle comprises a motor vehicle and a trailer, said first brake being a trailer braking system, said second brake being a motor vehicle braking system, and said braking test energy comprises a trailer braking test pressure transmitted from the motor vehicle braking system to the trailer braking system.

12. The process of claim 10 further comprising determining the momentary value of the response energy of said at least one brake as follows:
   (a) supplying a braking test energy to said brake to be tested,
   (b) measuring the deceleration of said vehicle after the braking test energy in step (a) as been supplied to the brake to be tested to determine a value of vehicle test deceleration, (c) releasing the energy supplied to said brake in step (a), (d) measuring the current vehicle deceleration of said vehicle to determine a value of ground-vehicle deceleration, (e) comparing the value of ground-vehicle deceleration with the value of vehicle test deceleration, and (f) if the value of vehicle test deceleration is greater than the value of ground-vehicle deceleration by more than a predetermined tolerance value, repeating steps (a) to (e) with a reduced braking test energy until the difference between the value of vehicle test deceleration and ground-vehicle deceleration is decreased to no more than the predetermined tolerance value, or (g) if the value of vehicle test deceleration is equal to or less than the value of ground-vehicle deceleration, repeating steps (a) to (e) with a higher braking test energy until the value of vehicle test deceleration exceeds the value of ground-vehicle deceleration by a value which is less than or equal to said predetermined tolerance value.

13. The process of claim 12 wherein said vehicle comprises a motor vehicle and a trailer, said first brake being a trailer braking system, said second brake being a motor vehicle braking system, and said braking test energy comprises a trailer braking pressure transmitted from the motor vehicle braking system to the trailer braking system.

14. The process of claim 10 further comprising determining the momentary value of the response energy of said at least one brake as follows:

(a) measuring the existing vehicle deceleration of said vehicle to determine a value of ground-vehicle deceleration, (b) supplying a first braking test energy to said first brake and a second braking test energy to said second brake, (c) releasing the energy supplied to said second brake, (d) maintaining the first braking test energy supplied to said first brake for a predetermined trailing time, (e) during said trailing time, measuring the deceleration of said vehicle to determine a value of vehicle test deceleration, (f) comparing the value of ground-vehicle deceleration with the value of vehicle test deceleration, and (g) if said value of vehicle test decoration is greater than said value of ground-vehicle deceleration by more than a predetermined tolerance value, repeating steps (a) to (f) with reduced first braking test energy until the difference between the value of vehicle test deceleration and the value of ground-vehicle deceleration is decreased to no more than the predetermined tolerance value, or (h) if said value of vehicle test deceleration is equal to or less than said value of ground-vehicle deceleration, repeating steps (a) to (f) with a higher first braking test energy until the value of vehicle test deceleration exceeds the value of ground-vehicle deceleration by a value which is less than or equal to said predetermined tolerance value.

15. The process of claim 14 wherein said vehicle comprises a motor vehicle and a trailer, said first brake being a trailer braking system, said second brake being a motor vehicle braking system, and said first braking test energy comprises a trailer braking test pressure transmitted from the motor vehicle braking system to the trailer braking system.

16. The process of claim 10 further comprising determining the momentary value of the response energy of said at least one brake as follows:

(a) supplying a first braking test energy to said first brake and a second braking test energy to said second brake, (b) releasing the energy supplied to said second brake, (c) maintaining the first braking test energy in said first brake for a predetermined trailing time, (d) during said trailing time, measuring the current vehicle deceleration of said vehicle to determine a value of vehicle test deceleration, (e) after said trailing time, measuring the vehicle deceleration to determine a vehicle of ground-vehicle deceleration, (f) comparing the value of ground-vehicle deceleration with the value of vehicle test deceleration, (g) if the value of vehicle test deceleration is greater than the value of ground-vehicle deceleration by more than a predetermined tolerance value, repeating steps (a) to (f) with a reduced first braking test energy until the difference between the value of vehicle test deceleration and the value of ground-vehicle deceleration has been reduced to no more than the predetermined tolerance value, or (h) if the value of vehicle test deceleration is equal to or less than the value of ground-vehicle deceleration, repeating steps (a) to (f) with a higher first braking test energy until the value of vehicle test deceleration exceeds the value of ground-vehicle deceleration by a value which is less than or equal to said predetermined tolerance value.

17. The process of claim 16 wherein said vehicle comprises a motor vehicle and a trailer, said first brake being a trailer braking system, said second brake being a motor vehicle braking system, and said first braking test energy comprises a trailer braking pressure transmitted from the motor vehicle braking system to the trailer braking system.

* * * * *